(12) United States Patent
Tsujiyama (10) Patent No.: US 8,285,136 B2
(45) Date of Patent: Oct. 9, 2012

(54) DIAPHRAGM CONTROL APPARATUS OF INTERCHANGEABLE LENS CAMERA

(75) Inventor: Junki Tsujiyama, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 0 days.

(21) Appl. No.: 12/710,512

(22) Filed: Feb. 23, 2010

(65) Prior Publication Data

US 2010/0220990 A1    Sep. 2, 2010

(30) Foreign Application Priority Data

Feb. 27, 2009   (JP) ................. 2009-045849

(51) Int. Cl.
*G03B 7/10*   (2006.01)
(52) U.S. Cl. ........................................... 396/260
(58) Field of Classification Search .......... 396/260, 396/505–510, 449–451, 256, 257, 244
See application file for complete search history.

(56) References Cited

U.S. PATENT DOCUMENTS

| | | | | |
|---|---|---|---|---|
| 4,327,416 | A * | 4/1982 | Jerrim | 702/104 |
| 7,798,731 | B2 * | 9/2010 | Kurosawa | 396/505 |
| 2003/0012568 | A1 * | 1/2003 | Ishikawa et al. | 396/104 |
| 2005/0063031 | A1 * | 3/2005 | Wada | 359/199 |
| 2007/0146537 | A1 * | 6/2007 | Uchiyama | 348/362 |
| 2008/0111900 | A1 | 5/2008 | Numako et al. | |
| 2008/0170845 | A1 | 7/2008 | Kurosawa | |
| 2008/0199176 | A1 | 8/2008 | Kurosawa | |
| 2008/0226280 | A1 | 9/2008 | Numako et al. | |
| 2009/0263120 | A1 * | 10/2009 | Kurosawa | 396/508 |
| 2010/0163333 | A1 * | 7/2010 | Patil et al. | 180/402 |

FOREIGN PATENT DOCUMENTS

| | | |
|---|---|---|
| JP | 5-333933 | 12/1993 |
| JP | 2008-197552 | 8/2008 |

* cited by examiner

*Primary Examiner* — Clayton E Laballe
*Assistant Examiner* — Noam Reisner
(74) *Attorney, Agent, or Firm* — Greenblum & Bernstein P.L.C.

(57) ABSTRACT

A diaphragm control apparatus incorporated in a camera body, to which an interchangeable lens equipped with a diaphragm apparatus is detachably attached, the diaphragm apparatus including a diaphragm operatively-associated rod for driving an adjustable diaphragm to open and shut the adjustable diaphragm, and the diaphragm control apparatus including a slide member that is driven to move the diaphragm operatively-associated rod, the diaphragm control apparatus includes a diaphragm drive mechanism including a stepping motor and a lead screw which is driven to rotate by the stepping motor, wherein the slide member is moved by rotation of the lead screw, a position detector for detecting a position of the slide member, and a controller for adjusting an excitation phase of the stepping motor based on a stop position of the slide member detected by the position detector.

12 Claims, 10 Drawing Sheets

DIAPHRAGM CONTROL APPARATUS OF INTERCHANGEABLE LENS CAMERA

BACKGROUND OF THE INVENTION

Field of the Invention

The present invention relates to a diaphragm control apparatus of an interchangeable lens camera, and in particular, relates to a diaphragm control apparatus which enables an adjustable diaphragm of an interchangeable lens (attached to a camera body) to be controlled in the camera body during exposure in an interchangeable lens SLR camera system.

Diaphragm mechanisms (i.e., aperture mechanisms) of conventional interchangeable lens SLR camera systems are configured in a manner so that a diaphragm control bar, which constitutes an element of a diaphragm control mechanism of a camera body, moves a diaphragm operatively-associated rod of the interchangeable lens that is provided to drive a diaphragm mechanism of the interchangeable lens. In the case where the diaphragm control mechanism is powered by a motor of a mirror drive mechanism or a shutter charge mechanism, the diaphragm can be controlled only in a single direction due to the structure of the diaphragm control mechanism. For instance, the diaphragm control mechanism controls the operation of the diaphragm in such a manner as to drive the diaphragm in a diaphragm stop-down direction from an open-aperture (full-aperture) state and subsequently stops the stop-down movement of the diaphragm with a ratchet when the diaphragm is stopped down to the previously-set aperture value (i.e., f-number), and accordingly, the f-number of the diaphragm cannot be adjusted afterwards.

In such conventional diaphragm mechanisms, when a live-view operation, in which image data obtained from an image sensor (image pickup device) is displayed on a display monitor in real tune, or a moving-image shooting operation is performed, the f-number cannot be adjusted from an initially-set f-number.

To make a live-view operation possible, the assignee of the prevent invention has proposed an invention for controlling the operation of an adjustable diaphragm so as to open and shut with the use of a diaphragm drive motor serving as a driving source of a diaphragm control mechanism (Japanese Unexamined Patent Publication 2008-197552). This invention makes it possible to make an adjustment to a diaphragm setting during a live-view operation or a moving-image shooting operation.

In conventional interchangeable lenses, the open-aperture reference position of the diaphragm operatively-associated rod varies depending on the f-number at open aperture. Therefore, when an interchangeable lens is attached to a camera body, the amount of movement of the diaphragm control rod, which is provided on the camera body, by the diaphragm operatively-associated rod varies depending on the type of interchangeable lens attached to the camera body. In the case where a stepping motor is used as a driving source of the diaphragm control mechanism, the stepping motor is forced to rotate in association with movements of the diaphragm control rod; however, the amount of rotation of the stepping motor varies depending on the type of interchangeable lens attached to the camera body. Therefore, the stepping motor (the rotor thereof) rotates from the initial detent position thereof, which makes the stop position of the stepping motor uncertain. Additionally, in conventional interchangeable lenses, it is sometimes the case that the open-aperture reference position of the diaphragm operatively-associated rod, i.e., the initial position thereof relative to a camera body when an interchangeable lens is attached to the camera body, may have an error due to mechanical error, assembling error, etc. In such a case also, due to this positional error, it is sometimes the case that the initial position of the stepping motor deviates from the original position.

Stepping motors available as diaphragm drive motors are usually of a type which is driven to rotate by steps in one direction normally by repeating a plurality of excitation patterns in sequence. In this type of stepping motor, if the stop position and the phase of the excitation pattern do not coincide with each other, there has been a problem in which the stepping motor may rotate in a direction reverse to the required rotation direction or not rotate at all, which causes a mismatch between the number of excitations and the number of steps for driving the stepping motor, thus causing an error in f-number control.

SUMMARY OF THE INVENTION

The present invention has been devised in view of the above described problems of the prior art and provides a diaphragm control apparatus of an interchangeable lens camera, wherein the diaphragm control apparatus makes it possible to perform continuous diaphragm control during exposure when an interchangeable lens equipped with a diaphragm operatively-associated rod is attached to the camera body and also makes it possible to perform precise stepping-drive control for the diaphragm even a stepping motor is used as a driving source of the diaphragm control apparatus.

According to an aspect of the present invention, a diaphragm control apparatus is provided, incorporated in a camera body, to which an interchangeable lens equipped with a diaphragm apparatus is detachably attached, the diaphragm apparatus including a diaphragm operatively-associated rod for driving an adjustable diaphragm to open and shut the adjustable diaphragm, and the diaphragm control apparatus including a slide member that is driven to move the diaphragm operatively-associated rod, the diaphragm control apparatus including a diaphragm drive mechanism including a stepping motor and a lead screw which is driven to rotate by the stepping motor, wherein the slide member is moved by rotation of the lead screw; a position detector for detecting a position of the slide member; and a controller for adjusting an excitation phase of the stepping motor based on a stop position of the slide member detected by the position detector.

The position detector can detect a position of the slide member relative to a stationary member.

When the slide member is forcibly driven to move by the diaphragm operatively-associated rod to a position corresponding to an initial position of the diaphragm operatively-associated rod, it is desirable for the controller to detect an initial position of the slide member via the position detector; to excite the stepping motor to rotate the stepping motor in one direction thereof by a predetermined number of steps in one driving excitation pattern; to repeat a process of detecting a current position of the slide member via the position detector after exciting the stepping motor by one step in the other direction toward an initial position thereof in another driving excitation pattern, and to determine whether a returning movement of the slide member to the initial position thereof is completed by comparing the current position with the initial position of the slide member; and, upon determining that the returning movement of the slide member to the initial position thereof is completed, to set a last excitation pattern as an initial excitation pattern.

When the slide member is forced to move by the diaphragm operatively-associated rod to a position corresponding to an initial position of the diaphragm operatively-associated rod, it is desirable for the controller to excite the stepping motor to rotate the stepping motor in one direction thereof by a predetermined number of steps in a driving excitation pattern; to repeat a process of detecting a current position of the slide member via the position detector, detecting a current position of the slide member via the position detector after exciting the stepping motor by one step in the other direction toward an initial position thereof in another driving excitation pattern, and determining whether a returning movement of the slide member to the initial position thereof is completed by comparing the former current position and the latter current position of the slide member with each other; and, upon determining that the returning movement of the slide member to the initial position thereof is completed, to set a last previous excitation pattern as an initial excitation pattern.

It is desirable for the diaphragm control apparatus to include an elastic biasing member which biases the slide member in a direction toward an open-aperture movable limit position; a biasing-force release mechanism for releasing a biasing force exerted on the slide member by the elastic biasing member; and a reset mechanism for resetting the biasing-force release mechanism so that the elastic biasing member again biases the slide member in the direction toward the open-aperture movable limit position.

It is desirable for the diaphragm control apparatus to be accommodated in an SLR camera provided with a mirror drive mechanism that performs a mirror-up operation and a mirror-down operation, wherein the biasing-force release mechanism and the reset mechanism are operatively associated with the mirror drive mechanism so that the biasing-force release mechanism is driven when the mirror drive mechanism performs a mirror-up operation and the reset mechanism resets the biasing-force release mechanism so that the elastic biasing member again biases the slide member when the mirror drive mechanism performs a mirror-down operation.

It is desirable for the slide plate to be movable by forcing the lead screw and the stepping motor to rotate via the diaphragm operatively-associated rod.

It is desirable for the position detector to include a non-contact sensor having an auto-compensation function.

It is desirable for the position detector to include a magnet and a Hall element.

It is desirable for the diaphragm apparatus of the interchangeable lens to include a diaphragm ring positioned coaxially with an optical axis of the interchangeable lens to be rotatable about the optical axis, the diaphragm operatively-associated rod being integrally formed with the diaphragm ring to project rearward from a rear end of the interchangeable lens.

It is desirable for the biasing-force release mechanism to include a cant member, and for the elastic biasing member to be a spring member which projects from the cam member.

In an embodiment, an SLR camera is provided, including a diaphragm control apparatus incorporated in a camera body of the SLR camera, to which an interchangeable lens equipped with a diaphragm apparatus is detachably attached, the diaphragm apparatus including a diaphragm operatively-associated rod for driving an adjustable diaphragm to open and shut the adjustable diaphragm, and the diaphragm control apparatus including a slide member that is driven to move the diaphragm operatively-associated rod. The diaphragm control apparatus includes a diaphragm drive mechanism including a stepping motor and a lead screw which is driven to rotate by the stepping motor, wherein the slide member is moved by rotation of the lead screw; a position detector for detecting a position of the slide member; and a controller for adjusting an excitation phase of the stepping motor based on a stop position of the slide member detected by the position detector.

According to the present invention, due to the above described structure, the stepping motor can be driven precisely from the very first step because the stop position of the stepping motor can be detected by the controller and the position detector even if the slide member is forced to move to thereby rotate the stepping motor.

The present disclosure relates to subject matter contained in Japanese Patent Application No. 2009-45849 (filed on Feb. 27, 2009) which is expressly incorporated herein by reference in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

An embodiment of an SLR camera system according to the present invention is provided with a camera body 10 and an interchangeable lens (photographic lens) 100 detachably attached to the camera body 10. A body mount (mount ring) 13 is fixed to an approximate center of the front of the camera body 10. The camera body 10 is provided on the surface of the body mount 13 with an AF coupler 14, a group of information contacts 15, a lock pin 16 and amount index mark 17. The camera body 10 is provided on an inner periphery of the body mount 13 with a bayonet mount 18. The camera body 10 is provided in a mirror box thereof with a main mirror 20, and is provided, on the left hand side of the main mirror 20 with respect to FIG. 1 in the vicinity of the bayonet mount 18, with a diaphragm control rod 19 for controlling movements of a diaphragm operatively-associated rod 109 of the interchangeable lens 100.

Figure 1:
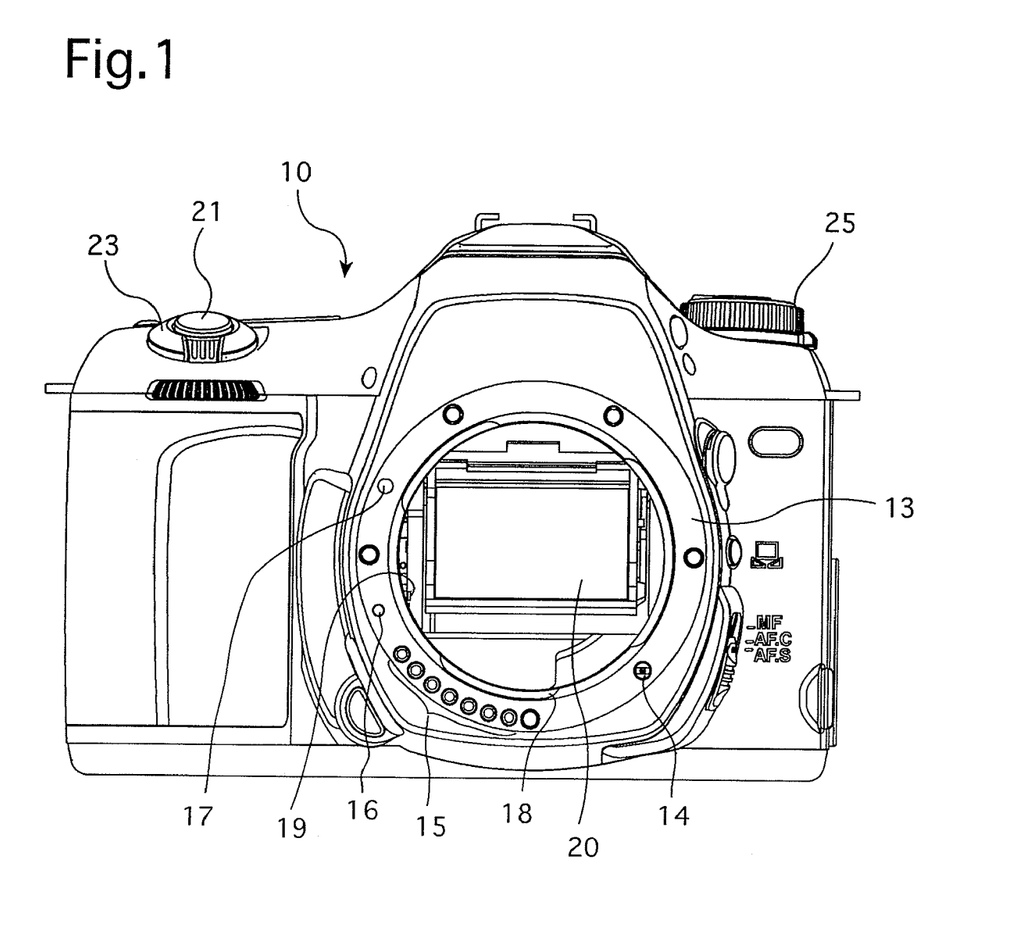
FIG. 1 is a front elevational view of a camera body of an SLR camera system according to the present invention.

The camera body 10 is provided, on the top left thereof with respect to FIG. 1, with a shutter release button 21, and is provided around the shutter release button 21 with a rotary ring-shaped power switch 23. The camera body 10 is provided, on top right thereof with respect to FIG. 1, with a mode dial 25.

The power switch 23 is structured to be manually rotatable. The power switch 23 is click-stopped at the OFF position and at the ON position and can be turned to a live-view position (set on the opposite side of the ON position from the OFF position) against a spring biasing force. If the power switch 23 is further turned toward the live-view position from the ON position, the live-view switch is turned ON while the power remains switched ON.

The mode dial 25 is a rotary switch which stops with a click at each of a plurality of different stop positions. Various exposure modes such as a still-image photographing mode and a movie recording mode can be selected (switched) according to the click-stop position of the mode dial 25.

Figure 2A:
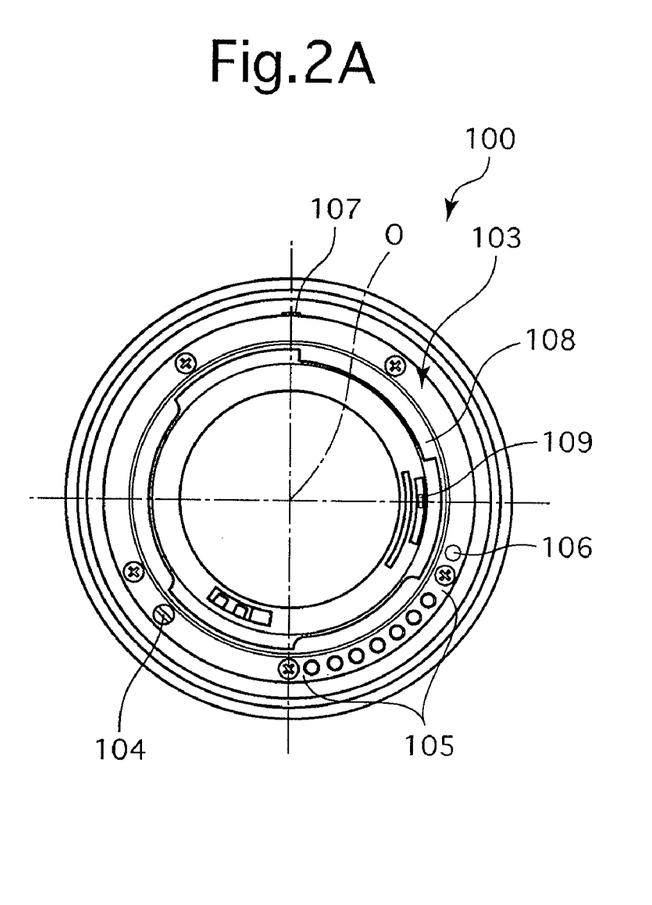
FIG. 2A is a rear elevational view of an interchangeable lens that is attachable to the camera body and includes a diaphragm operatively-associated rod.
Figure 2B:
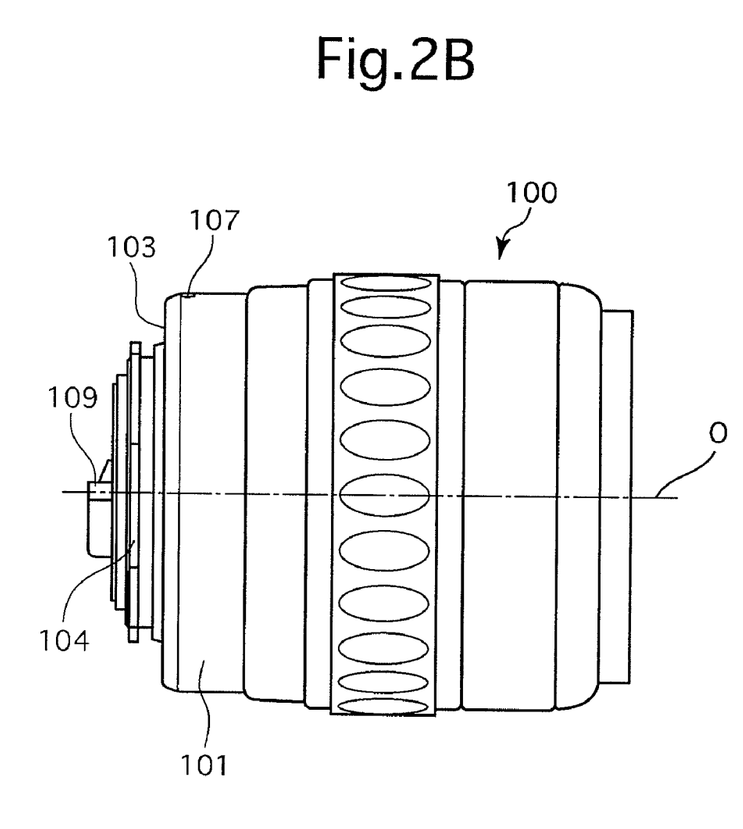
FIG. 2B is a side elevational view of the interchangeable lens shown in FIG. 2A.

The interchangeable lens 100 is provided at the rear end thereof with a lens mount ring 103. The interchangeable lens 100 is provided on the surface of the lens mount ring 103 with an AF coupler 114, a group of information contacts 105 and a lock hole 106 which correspond to the AF coupler 14, the group of information contacts 15 and the lock pin 16 that are provided on the surface of the body mount 13, respectively. The interchangeable lens 100 is provided on an inner periphery of the lens mount ring 103 with a bayonet mount 108. The interchangeable lens 100 is further provided immediately inside an inner peripheral surface of the bayonet mount 108 with the diaphragm operatively-associated rod 109 that is interlocked with the diaphragm control rod 19 of the camera body 10 when the interchangeable lens 100 is properly mounted onto the camera body 10. The interchangeable lens 100 is provided thereon with a mount index mark 107 which corresponds to the mount index mark 17 of the camera body 10.

When the interchangeable lens 100 is attached to the camera body 10, the bayonet mounts 18 and 108 are brought into engagement with each other with the mount index marks 17 and 107 being aligned with each other, and subsequently the interchangeable lens 100 is rotated clockwise relative to the camera body 10 as viewed from front of the camera body 10. This clockwise rotation of the interchangeable lens 100 relative to the camera body 10 causes the diaphragm operatively-associated rod 109 of the interchangeable lens 100 to come into contact with the diaphragm control rod 19 of the camera body 10, a further clockwise rotation of the interchangeable lens 100 causes the diaphragm control rod 19 to move due to the engagement of the diaphragm control rod 19 with the diaphragm operatively-associated rod 109, and a subsequently further clockwise rotation of the interchangeable lens 100 causes the lock pin 16 to be engaged in the lock hole 106 with a click at a locked position, whereby the interchangeable lens 100 stops rotating relative to the camera body 10 so that the interchangeable lens 10 becomes properly mounted onto the camera body 10. Thereupon, the diaphragm operatively-associated rod 109 reaches one end of the moving range thereof (this position of the diaphragm operatively-associated rod 109 corresponds to the open-aperture reference position thereof), and the diaphragm control rod 19 has been forced to rotate to a position corresponding to the open-aperture reference position of the diaphragm operatively-associated rod 109 from the initial position. With the interchangeable lens 100 in this locked position, the AF coupler 104 is engaged with the AF coupler 14 and the group of information contacts 105 is in electrical contact with the group of information contacts 15.

Figure 3:
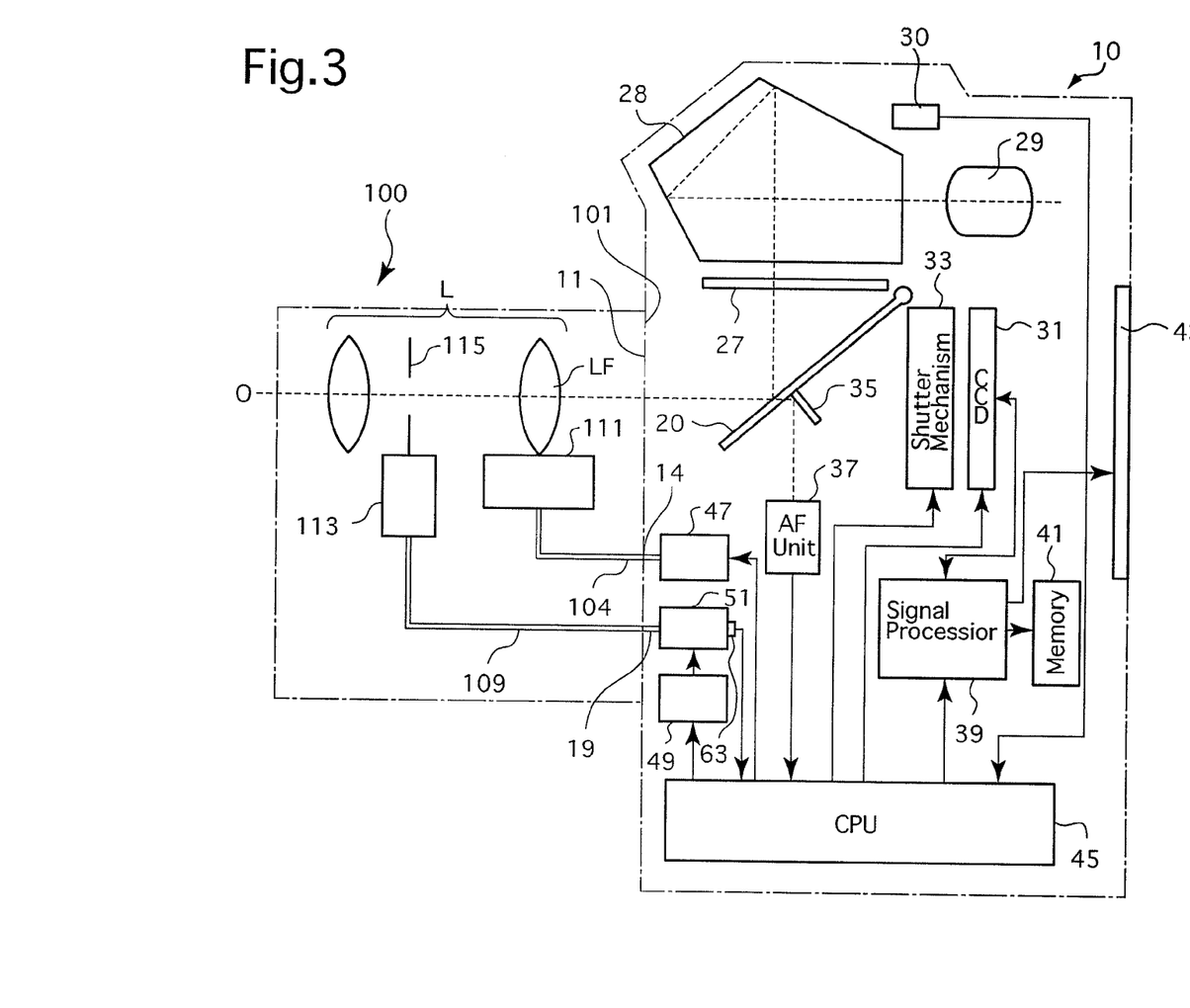
FIG. 3 is a block diagram showing main elements of the SLR camera system in a state where the interchangeable lens is attached to the camera body.

FIG. 3 is a schematic block diagram showing main elements of the camera body 10 and the interchangeable lens 100 attached to the camera body 10. The camera body 10 is provided above the main mirror 20 with a focusing screen 27, a pentagonal prism 28 and an eyepiece 29, which serve as elements of an optical viewfinder through which an object image formed through the interchangeable lens 100 is viewed. The camera body 10 is provided in the vicinity of the eyepiece 29 with a photometering element 30.

The camera body 10 is provided behind the main mirror 20 with an image sensor (image pickup device) 31 such as a CCD image sensor which receives object light upon the main mirror 20 being raised to the retracted position (mirror-up position) to capture an object image, and is provided immediately in front of the image sensor 31 with a shutter mechanism 33. The camera body 10 is provided, immediately behind a half-mirror portion formed at a central portion of the main mirror 20, with a sub-mirror 35 which reflects part of the incident object light downward. The camera body 10 is provided, below the sub-mirror 35 at the bottom of the mirror box, with an AF unit 37 which receives the object light reflected by the sub-mirror 35 to detect a focus state. The AF unit 37 is a so-called TTL phase-difference detector that outputs a pair of object image signals obtained by pupil splitting as AF data. A CPU (controller) 45 provided in the camera body 10 calculates a defocus amount from this AF data, and further calculates data necessary for moving a focusing lens group of the interchangeable lens 100 attached to the camera body 10.

The camera body 10 is provided therein with a signal processor 39. The signal processor 39 processes image signals obtained by an image capturing operation of the image sensor 31, compresses or does not compress the processed image signals, and stores the image signals thus compressed or not compressed in an image memory 41 provided in the camera body 10. The camera body 10 is provided on the back thereof with a display 43 (e.g., an LCD panel) which displays captured images. The image displaying operation of the display 43 is controlled by the signal processor 39.

The camera body 10 is provided with an AF system 47 and a diaphragm control mechanism 51. The AF system 47 drives an AF mechanism 111 of the interchangeable lens 100, and the diaphragm control mechanism 51 controls the operation of a diaphragm apparatus 113 of the interchangeable lens 100. The AF system 47 incorporates a motor (not shown) and transmits rotation of this motor to the AF mechanism 111 of the interchangeable lens 100 via the AF couplers 14 and 104 so that the AF mechanism 111 moves a focusing lens group LF of a photographing optical system L (see FIG. 3) contained in the interchangeable lens 100 to an in-focus position. The operation of the diaphragm control mechanism 51 is controlled by the CPU 41 via a diaphragm drive circuit 49 provided in the camera body 10 to drive the diaphragm control rod 19.

In addition, photometric data output from the photometering element 30 disposed in the camera body 10 in the vicinity of the eyepiece 29 and AF data output from the AF unit 37 are input to the CPU 45. Based on these data, the CPU 45 calculates appropriate data for the f-number and appropriate lens drive data for focusing, drives the diaphragm control mechanism 51 via the diaphragm drive circuit 49 in accordance with the calculated data on f-number, and drives the AF system 47 in accordance with the calculated lens drive data.

The diaphragm apparatus 113 of the interchangeable lens 100 operates to adjust the amount of light passing through a diaphragm aperture formed by a plurality of diaphragm blades 115 by opening and shutting the plurality of diaphragm blades 115. The diaphragm apparatus 113 is provided with the diaphragm operatively-associated rod 109 as described above, and the opening and shutting operation of the plurality of diaphragm blades 115 is controlled via the diaphragm operatively-associated rod 109.

Figure 4A:
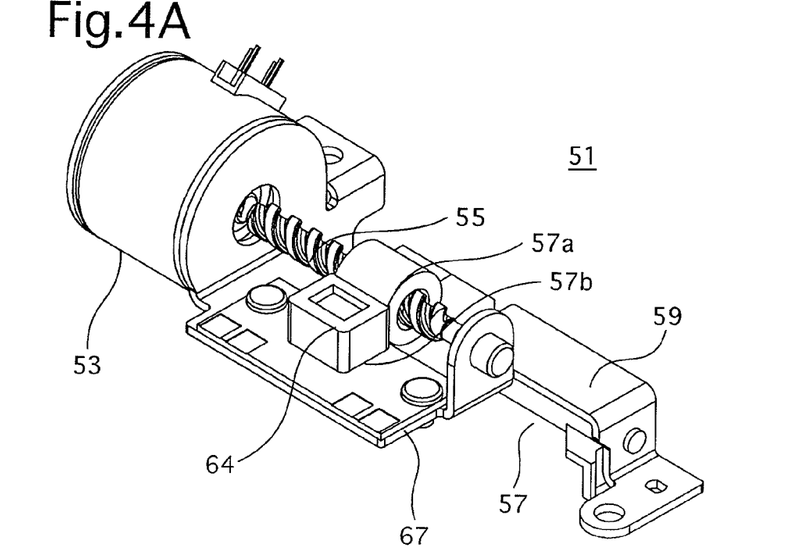
FIG. 4A is a perspective view of a diaphragm control mechanism incorporated in the camera body.
Figure 4B:
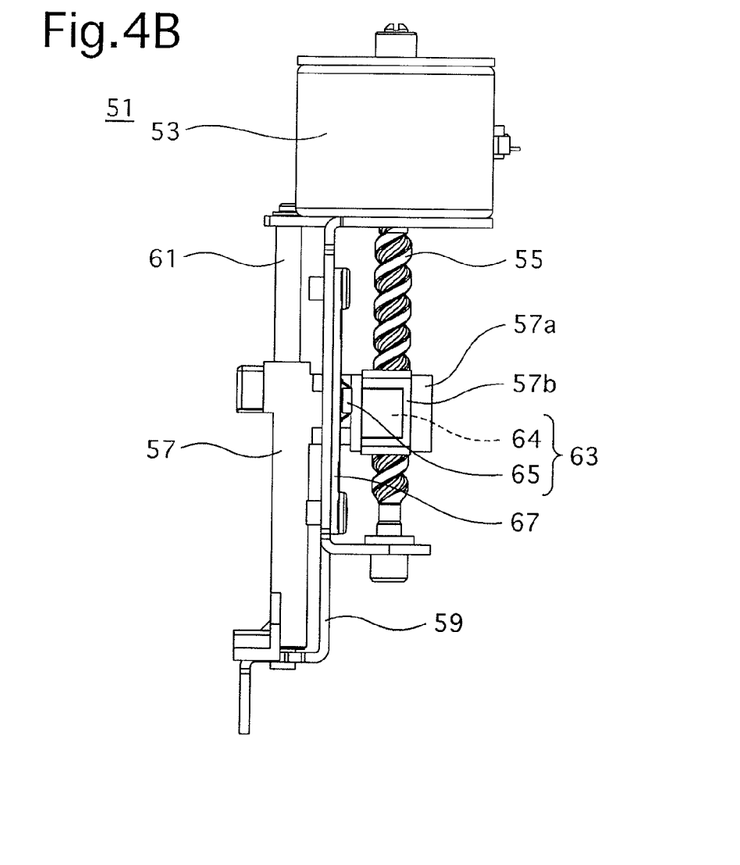
FIG. 4B is a rear elevational view of the diaphragm control mechanism shown in FIG. 4A.
Figure 5:
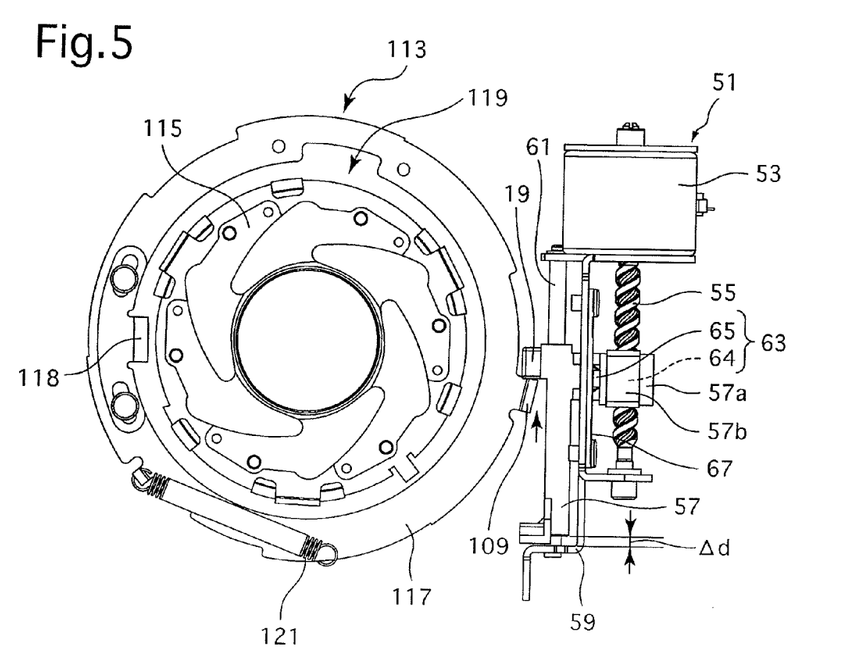
FIG. 5 is a rear elevational view of the diaphragm control mechanism of the camera body shown in FIGS. 4A and 4B, and main elements of a diaphragm apparatus provided in the interchangeable lens with the diaphragm in an open aperture state, viewed from the rear of the camera body.
Figure 6:
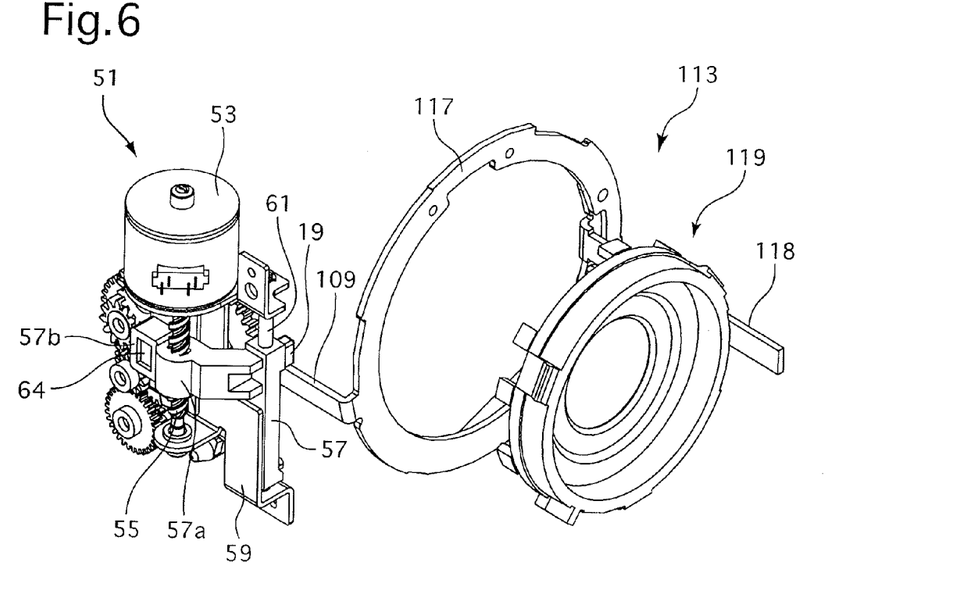
FIG. 6 is a perspective view of the diaphragm control mechanism of the camera body and main elements of the diaphragm apparatus of the interchangeable lens with the diaphragm in an open aperture state, viewed obliquely from the object side.
Figure 7:
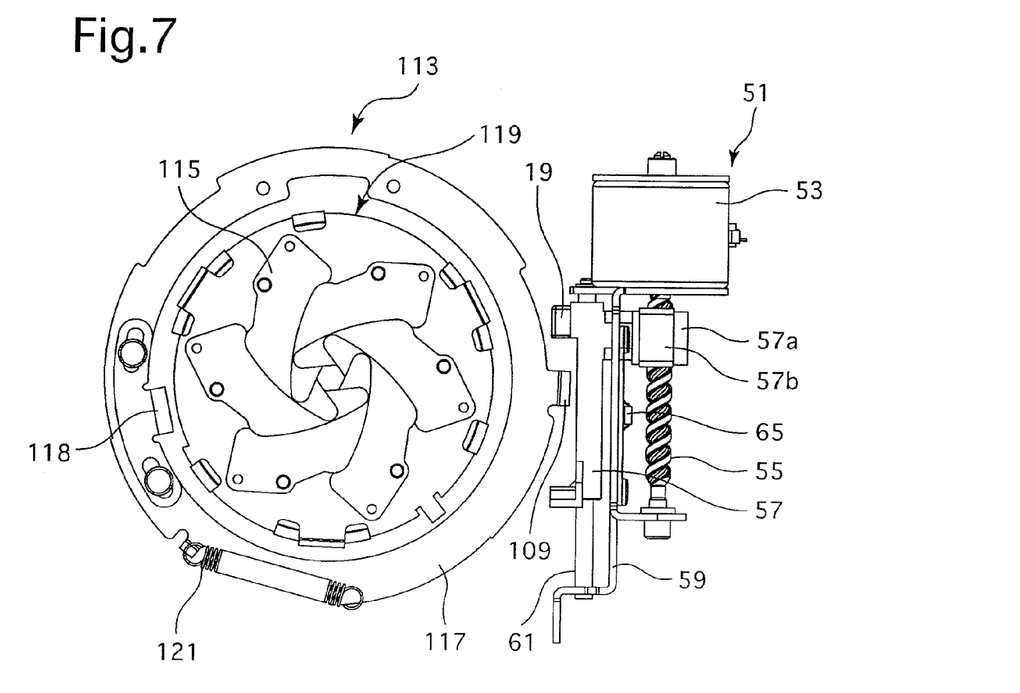
FIG. 7 is a view corresponding to FIG. 5, showing the diaphragm control mechanism of the camera body and the main elements of the diaphragm apparatus of the interchangeable lens in a fully stopped-down state.
Figure 8:
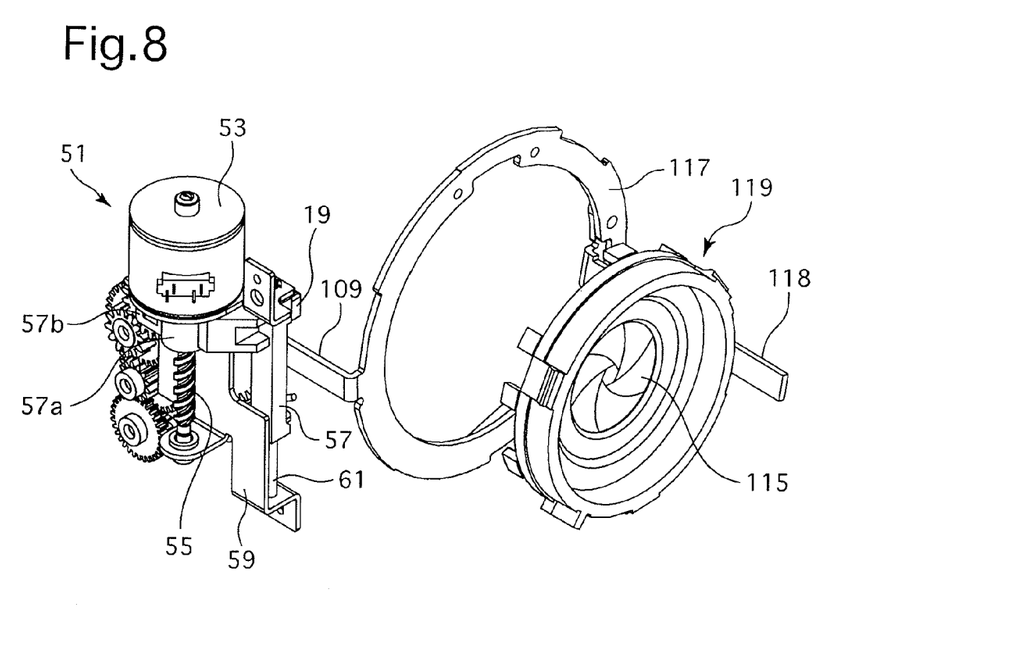
FIG. 8 is a view corresponding to FIG. 6, showing the diaphragm control mechanism of the camera body and the main elements of the diaphragm apparatus of the interchangeable lens in a fully stopped-down state.

The structures of the diaphragm control mechanism 51 and the diaphragm apparatus 113 will be discussed in detail with reference to FIGS. 4A through 8. FIG. 4A is a perspective view of the diaphragm control mechanism 51, FIG. 4B is a rear elevational view of the diaphragm control mechanism 51, FIGS. 5 and 7 are rear elevational views of the diaphragm control mechanism 51 and main elements of the diaphragm apparatus 113, viewed from the rear of the camera body 10. FIGS. 6 and 8 are perspective views of the diaphragm control mechanism 51 and main elements of the diaphragm apparatus 113, viewed obliquely from the object side.

The diaphragm control mechanism 51 is provided with a stepping motor 53 as a driving source thereof which has a lead screw 55 as a rotary shaft. Namely, the lead screw 55 rotates integrally with the rotor of the stepping motor 53. The stepping motor 53 is fixed to a frame (stationary member) 59, and the end (lower end with respect to FIGS. 5 through 8) of the lead screw 55 is supported by the frame 59 to be freely rotatable on the axis of the lead screw 55. The frame 59 is fixed to a stationary frame (not shown) of the camera body 10.

A screw nut 57a formed on an arm extending from a slide plate 57 is screw-engaged with the lead screw 55. The slide plate 57 is supported by a slide shaft 61 to be freely slidable thereon. Both ends of the slide shaft 61 are supported by the frame 59 so that the slide shaft 61 extends parallel to the lead screw 55. The diaphragm control rod 19 is formed to project from a portion of the slide plate 57 which engages with the slide shaft 61, thus moving with the slide plate 57. The stepping motor 53 and the lead screw 55, that are included in the diaphragm control mechanism 51, constitute a diaphragm drive mechanism.

The diaphragm control mechanism 51 can drive the stepping motor 53 stepwise to rotate the lead screw 55 stepwise. Namely, the diaphragm control mechanism 51 can integrally move the slide plate 57 and the diaphragm control rod 19, together with the screw nut 57a, stepwise in very small length units determined by a one-step rotation angle (rotation angle by one step excitation) and the lead of the lead screw 55. The moving range of the diaphragm control rod 19 in the present embodiment ranges from one end of the moving range on the open-aperture side shown in FIG. 4B where one end of the slide plate 57 in the sliding direction thereof comes in contact with a limit portion of the frame 59 to the other end of the moving range on the fully stopped-down side shown in FIGS. 7 and 8 where the other end of the slide plate 57 in the sliding direction thereof comes in contact with another limit portion of the frame 59.

In a state where no interchangeable lens is attached to the camera body 10, the slide plate 57 is mechanically stopped at the open-aperture end position, so that the stop position of the stepping motor 53 is also constant. However, attaching the interchangeable lens 100 to the camera body 10 causes the diaphragm operatively-associated rod 109 to come into contact with the diaphragm control rod 19 and subsequently move the diaphragm control rod 19 to the initial position that corresponds to the open-aperture reference position of the diaphragm operatively-associated rod 109. As shown in FIG. 5, the diaphragm control rod 19 (the slide plate 57) has been moved in the diaphragm stop-down direction (upward direction with respect to FIG. 5) by a displacement $\Delta d$. Due to this movement of the diaphragm control rod 19, the stepping motor 53 has been rotated by a rotation angle corresponding to the displacement $\Delta d$ divided by the lead of the lead screw 55. Therefore, when the interchangeable lens 100 is attached to the camera body 10, the stop position of the stepping motor 53, which serves as a point of origin thereof, becomes unclear.

If the origin of the stepping motor 53 becomes unclear, it becomes unclear as to from which excitation phase the stepping motor 53 should commence to be excited to rotate the stepping motor 53 stepwise. The present embodiment of the SLR camera system is characterized in that an appropriate first excitation phase can be set by detecting the position at which the stepping motor thus forced to rotate is currently at rest, i.e., by detecting the origin of the stepping motor 53. Features of this embodiment will be discussed hereinafter.

The diaphragm control mechanism 51 is provided with a magnet (permanent magnet) 64 and a Hall element 65 that serve as elements of an origin detection sensor (position detector) 63 for detecting the initial position of the slide plate 57. The magnet 64 is inserted into a box-shaped portion 57b formed on the screw nut 57a, and is fixed to the box-shaped portion 57b. The Hall element 65 is fixed to the frame 59 while being mounted on a Hall element board 67. If the origin detection sensor 63 uses a Hall element having an auto-compensation function, the influences and errors caused by environmental conditions and secular changes can be minimized.

The Hall element 65 senses a magnetic force from the magnet 64 and outputs a voltage according to this magnetic force. The CPU 45 detects the position of the magnet 64, i.e., the position of the slide plate 57, and hence, the position of the diaphragm control rod 19, in accordance with a detection signal output from the Hall element 65. Since the Hall element 65 outputs a detection signal according to the distance from the Hall element 65 to the magnet 64, the relative distance between the magnet 64 and the Hall element 65 can be detected within a predetermined range. The magnet 64 and the Hall element 65 are arranged so as to detect an initial position of the slide plate 57 corresponding to the open-aperture reference position of the diaphragm operatively-associated rod of the interchangeable lens equipped with the slide plate 57.

Figure 10A:
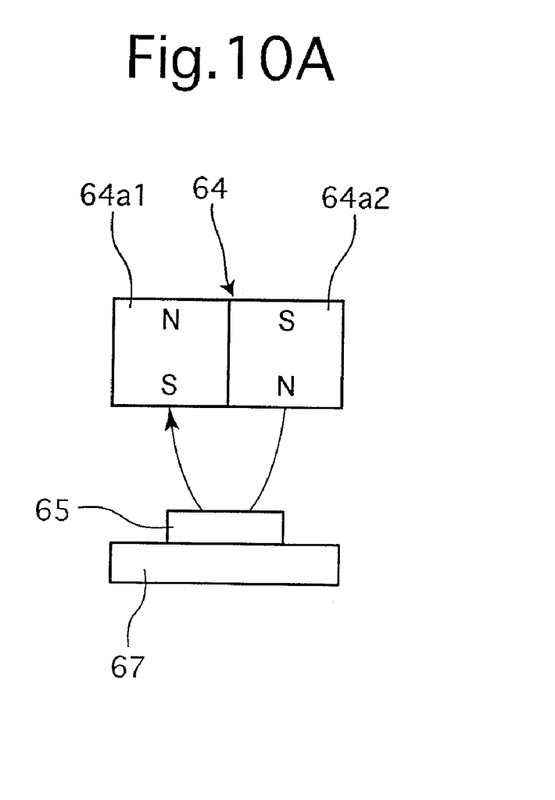
FIG. 10A is a schematic diagram of a first embodiment of a position detector for the diaphragm control mechanism.
Figure 10B:
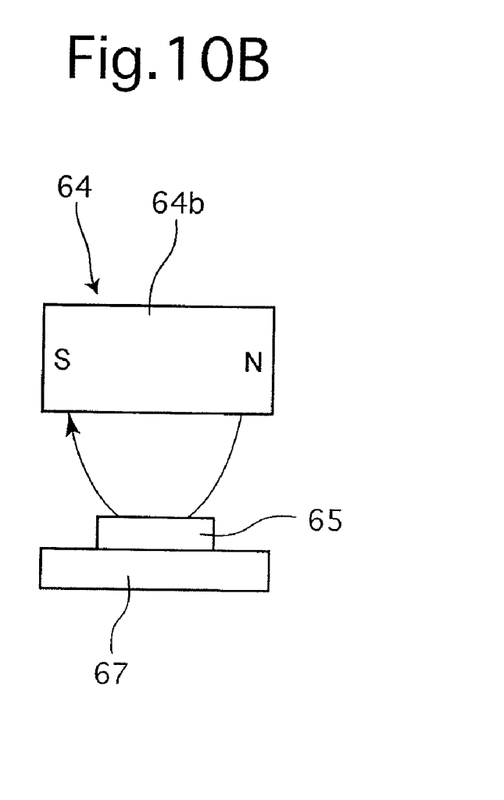
FIG. 10B is a schematic diagram of a second embodiment of the position detector for the diaphragm control mechanism.

FIG. 10A schematically shows the structure of an embodiment of the origin detection sensor 63 of the diaphragm control mechanism 51 and FIG. 10B schematically shows the structure of another embodiment of the origin detection sensor 63 of the diaphragm control mechanism 51. In each of these drawings, the leftward/rightward direction corresponds to the moving direction of the magnet 64.

In the embodiment shown in FIG. 10A, two magnets 64a1 and 64a2, which are joined together to constitute a magnet serving as the magnet 64, are arranged along the moving direction thereof so that opposite poles of the two magnets 64a1 and 64a2 face the Hall element 65. In the embodiment shown in FIG. 10A, a magnetic force of the magnet 64 exits out of the center of that surface of the n-pole of the magnet 64a2 which faces the Hall element 65 and enters into the center of that surface of the s-pole of the magnet 64a1 which faces the Hall element 65 as shown in FIG. 10A, and accordingly, the magnetic force changes abruptly in the relative moving direction (horizontal direction as viewed in FIG. 10A), and the sensitivity of the origin detection sensor 63 becomes acute. It is possible that a single ferromagnetic material be divided into two and that each of which be magnetized in a direction orthogonal to the relative moving direction.

In the embodiment shown in FIG. 10A, a magnet 64b serving as the magnet 64 is magnetized in the relative moving direction (horizontal direction as viewed in FIG. 10B). In this embodiment, a magnetic force of the magnet 64b exits out of a portion of the magnet 64b at one end in the relative moving direction and enters into a portion of the magnet 64b at the other end, and accordingly, variations in magnetic force become gentle (small) in the relative moving direction and the sensitivity of the origin detection sensor 63 is reduced.

The diaphragm apparatus 113 of the interchangeable lens 100 is provided with a diaphragm ring 117, a linkage rod 118 and a diaphragm mechanism 119. The diaphragm ring 117 rotates about an optical axis O of the interchangeable lens 100, and the diaphragm operatively-associated rod 109 of the diaphragm apparatus 113, which is engageable with the diaphragm control rod 19 of the camera body 10, projects rearward (toward the camera body 10 side) from the outer edge of the diaphragm ring 117. The linkage rod 118 projects from the inner edge of the diaphragm ring 117 toward the object side. The diaphragm mechanism 119 is provided with a plurality of diaphragm blades 115. The diaphragm mechanism 119 is of a conventional type which drives the plurality of diaphragm blades 115 so that they open and shut by receiving rotation of the linkage rod 118. The diaphragm ring 117 is biased to rotate in a direction to stop down the plurality of diaphragm blades 115.

With the above described structure, the diaphragm apparatus 113 of the interchangeable lens 100 is in a state such that the plurality of diaphragm blades 115 of the diaphragm mechanism 119 is in a fully stopped-down state by the spring biasing force of a diaphragm spring (extension coil spring) 121 when no interchangeable lens is attached to the camera body 10 or when the diaphragm operatively-associated rod 109 is in a free state as shown in FIGS. 7 and 8.

On the other hand, in a state where the interchangeable lens 100 is attached to the camera body 10, e.g., in an initial state shown in FIGS. 5 and 6, the diaphragm operatively-associated rod 109 has been rotated to the open-aperture reference position (a mechanical rotation limit position) with the diaphragm operatively-associated rod 109 being in contact with the diaphragm control rod 19 while the diaphragm ring 117 has been fully rotated in a diaphragm opening direction against the biasing force of the diaphragm spring 121 so that the plurality of diaphragm blades 115 are held in a fully-open state. In addition, the slide plate 57 and the diaphragm control rod 19 have been further moved in a diaphragm stop-down direction by the diaphragm operatively-associated rod 109 having being rotated to the open-aperture reference position and thus prevented from rotating, and are held in an initial position corresponding to the open-aperture reference position of the diaphragm operatively-associated rod 109.

Thereafter, the slide plate 57 and the diaphragm control rod 19 are moved in the diaphragm stop-down direction by rotation of the stepping motor 53, and the diaphragm operatively-associated rod 109 moves in the diaphragm stop-down direction following the movement of the diaphragm control rod 19. Thereafter, upon the stepping motor 53 coming to a stop, the diaphragm operatively-associated rod 109 also stops at this stop position, and an f-number corresponding to this position is set. The amount of stop-down of the diaphragm mechanism 119 is controlled according to the number of steps for driving the stepping motor 53.

In this fully stopped-down state, the stepping motor 53 can be driven in either direction, i.e., the diaphragm stop-down direction or the diaphragm opening direction. Namely, diaphragm control during exposure is possible. Therefore, diaphragm control during a live-view operation or a moving-image shooting operation is possible.

The camera body 10 is provided with a mirror drive mechanism for charging a mirror drive spring (for moving the main mirror up and down) by motor. The initial position of the slide plate 57 of the diaphragm control mechanism 51 is cleared or the slide plate 57 is forced to move to the initial position in association with the mirror drive mechanism. By making the diaphragm control mechanism 51 (the diaphragm apparatus 113 of the interchangeable lens 100) linked with the mirror drive mechanism in this manner, the continuous shooting speed can be improved.

FIGS. 9A, 9B, 9C and 9D show a relationship between main elements of an operatively-associated mechanism of the mirror drive mechanism of the camera body 10, which directly acts on the diaphragm control mechanism 51, and the diaphragm control mechanism 51. The operatively-associated mechanism is provided with a single-rotation gear 73 which rotates by one rotation while the main mirror 20 is driven up and then down. The single-rotation gear 73 rotates counterclockwise with respect to FIGS. 9A through 9D. The single-rotation gear 73 is integrally provided with a diaphragm drive cam 74. A cam lever (biasing-force release mechanism) 75 having a cam follower 75b, capable of coming in contact with an outer peripheral cam surface 74a of the diaphragm drive cam 74, is pivoted about a shaft 75a to be freely rotatable thereabout. A slide plate restriction spring (elastic biasing member) 77 is mounted onto the cam lever 75 so that one end of the slide plate restriction spring 77 is engaged with the cam lever 75 while the other end is restricted while being biased in a direction to come in contact with the slide plate 57 from a stopped-down position toward the initial position. The single-rotation gear 73 constitutes the mirror drive mechanism which drives the main mirror 20 via an intermeshing gear train.

Figure 9A:
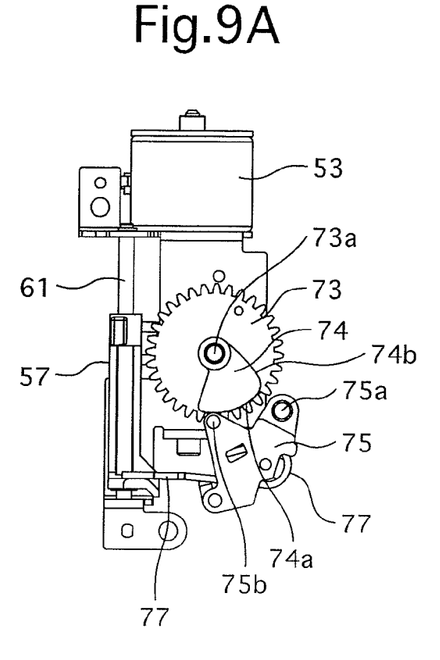
FIG. 9A is a side elevational view of the diaphragm control mechanism of the camera body and main elements of an operatively-associated mechanism of a mirror drive mechanism of the camera body that operates in association with the diaphragm control mechanism of the camera body, showing the diaphragm control mechanism of the camera body and the main elements of the operatively-associated mechanism in a state where the interchangeable lens is not attached to the camera body.

FIG. 9A shows a state where no interchangeable lens is attached to the camera body 10. In this state where no interchangeable lens is attached, the slide plate restriction spring 77 presses the slide plate 57 toward the initial position in a restrictive state where the cam surface 74a of the diaphragm drive cam 74 is in contact with the cam follower 75b of the cam lever 75. At this instance, the slide plate 57 moves to the open-aperture movable limit position thereof while rotating the lead screw 55 by the biasing force of the slide plate restriction spring 77 when the stepping motor 53 is in a non-excited state. In this non-excited state, the cam lever 75 is held in a non-rotatable state with the cam follower 75b being in contact with the cam surface 74a.

Figure 9B:
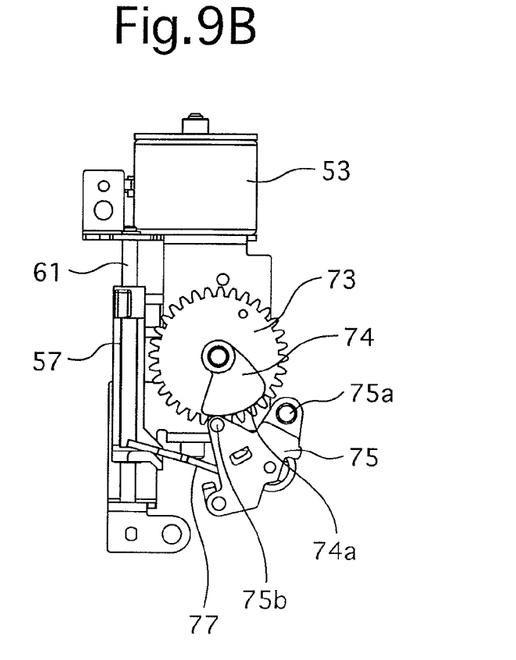
FIG. 9B is a view similar to that of FIG. 9A, showing the diaphragm control mechanism and the main elements of the operatively-associated mechanism in a state where the interchangeable lens is attached to the camera body.
Figure 9C:
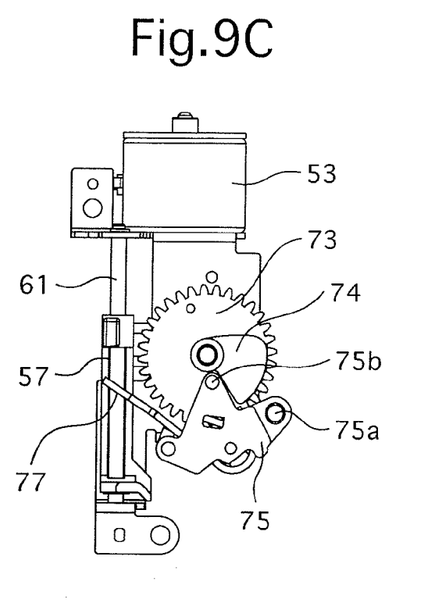
FIG. 9C is a view similar to that of FIG. 9A, showing the diaphragm control mechanism and the main elements of the operatively-associated mechanism at the commencement of an exposure control.

FIG. 9B shows a state where the interchangeable lens 100 is attached to the camera body 10. In this lens-attached state, the interchangeable lens 100 is held in an open aperture state in which the slide plate 57 has been forcibly moved in the diaphragm stop-down direction by the diaphragm operatively-associated rod 109 of the interchangeable lens 100, and the movement of the slide plate 57 is restricted by the diaphragm operatively-associated rod 109. When the interchangeable lens 100 is attached to the camera body 10, the slide plate 57 moves while rotating the lead screw 55 against the biasing force of the slide plate restriction spring 77. The slide plate 57 also moves in a similar manner when the stepping motor 53 is excited to rotate in the diaphragm stop-down direction.

Figure 9D:
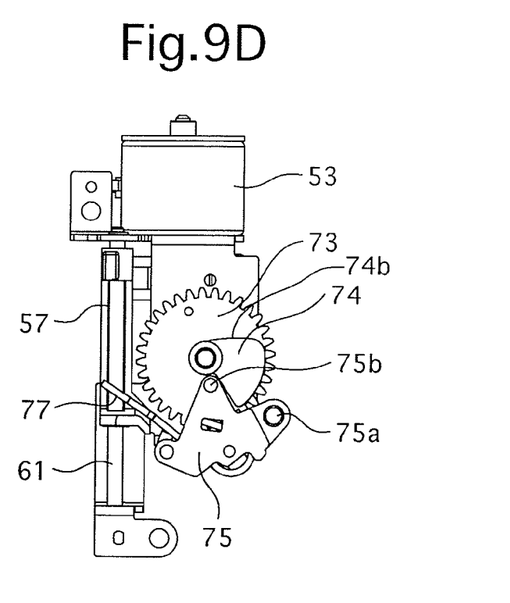
FIG. 9D is a view similar to that of FIG. 9A, showing the diaphragm control mechanism and the main elements of the operatively-associated mechanism in a fully stopped-down state during exposure.

At a time of exposure, the operation of the mirror drive mechanism is controlled to move up the main mirror 20 so that the single-rotation gear 73 together with the diaphragm drive cam 74 rotates counterclockwise by a predetermined angle of rotation to thereby make the cam surface 74a disengaged from the cam follower 75b. Thereupon, the cam lever 75 rotates to a restriction release position where the slide plate restriction spring 77 moves away from the slide plate 57 by the diaphragm spring 121 to allow the cam lever 75 to move (see FIG. 9C). In this restriction released state, the slide plate 57 becomes freely movable to the fully stopped-down position, and the stepping motor 53 is excited to move the slide plate 57 to a predetermined position. FIG. 9D shows a state where the slide plate has moved to the fully stopped-down position.

Upon completion of an exposure, the operation of the mirror drive mechanism is controlled to move down the main mirror 20 so that the single-rotation gear 73 together with the diaphragm drive cam 74 rotates counterclockwise to the initial position. Thereupon, before the diaphragm cam 74 reaches the initial position, a radial surface 74b of the diaphragm drive cam 74 comes in contact with the cam follower 75b to rotate the cam lever 75 counterclockwise to bias the slide plate 57 elastically in a direction toward the open-aperture movable limit position via the slide plate restriction spring 77. In other words, the diaphragm drive cam 74 (cam surface 74a) and the cam follower 75b constitute a reset mechanism for resetting the cam lever 75 so that the slide plate restriction spring 77 again biases the slide plate 57 toward the open-aperture movable limit. Thereupon, the slide plate 57 moves while rotating the lead screw 55 when the stepping motor 53 is not supplied with power (not excited), and stops at an initial position corresponding to the open-aperture reference position of the diaphragm operatively-associated rod 109 of the interchangeable lens 100 when the interchangeable lens 100 is attached to the camera body 10 (see FIG. 9B).

The origin detection sensor 63 (the magnet 64 and the Hall element 65) is configured to be capable of detecting an initial position of the slide plate 57 which corresponds to the open-aperture reference position of the diaphragm operatively-associated rod 109 of the interchangeable lens 100 attached to the camera body 10 with the diaphragm control rod 19 having been moved in the diaphragm stop-down direction from the initial position. Since the f-number at open aperture, i.e., the open-aperture end position of the diaphragm operatively-associated rod 109, varies according to the type of the interchangeable lens attached to the camera body 10 as described above, the origin detection sensor 63 is made and arranged to be capable of detecting the initial position of the slide plate 57 in a predetermined detection range.

Figure 11:
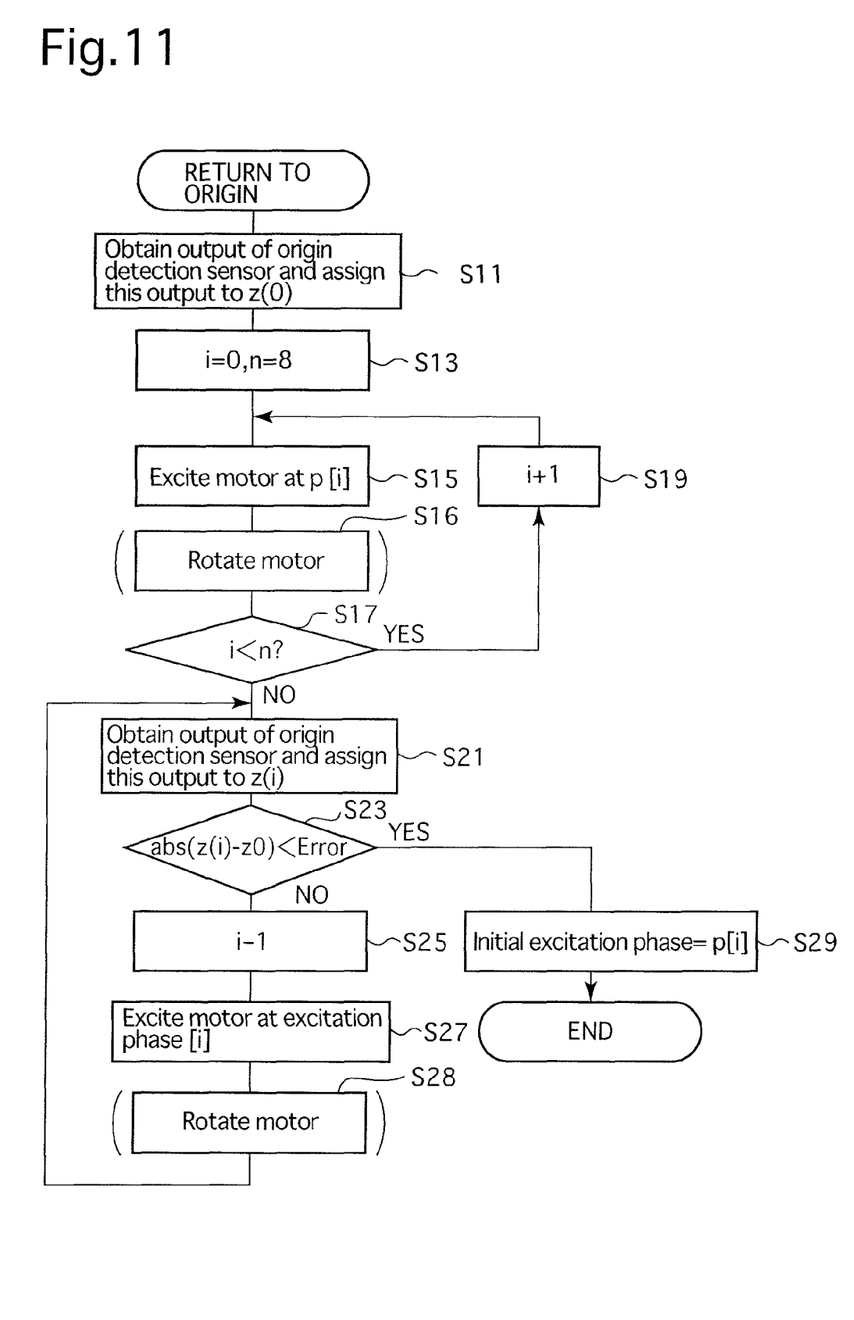
FIG. 11 is a flow chart showing a first embodiment of an origin returning process of the diaphragm control mechanism.
Figure 12:
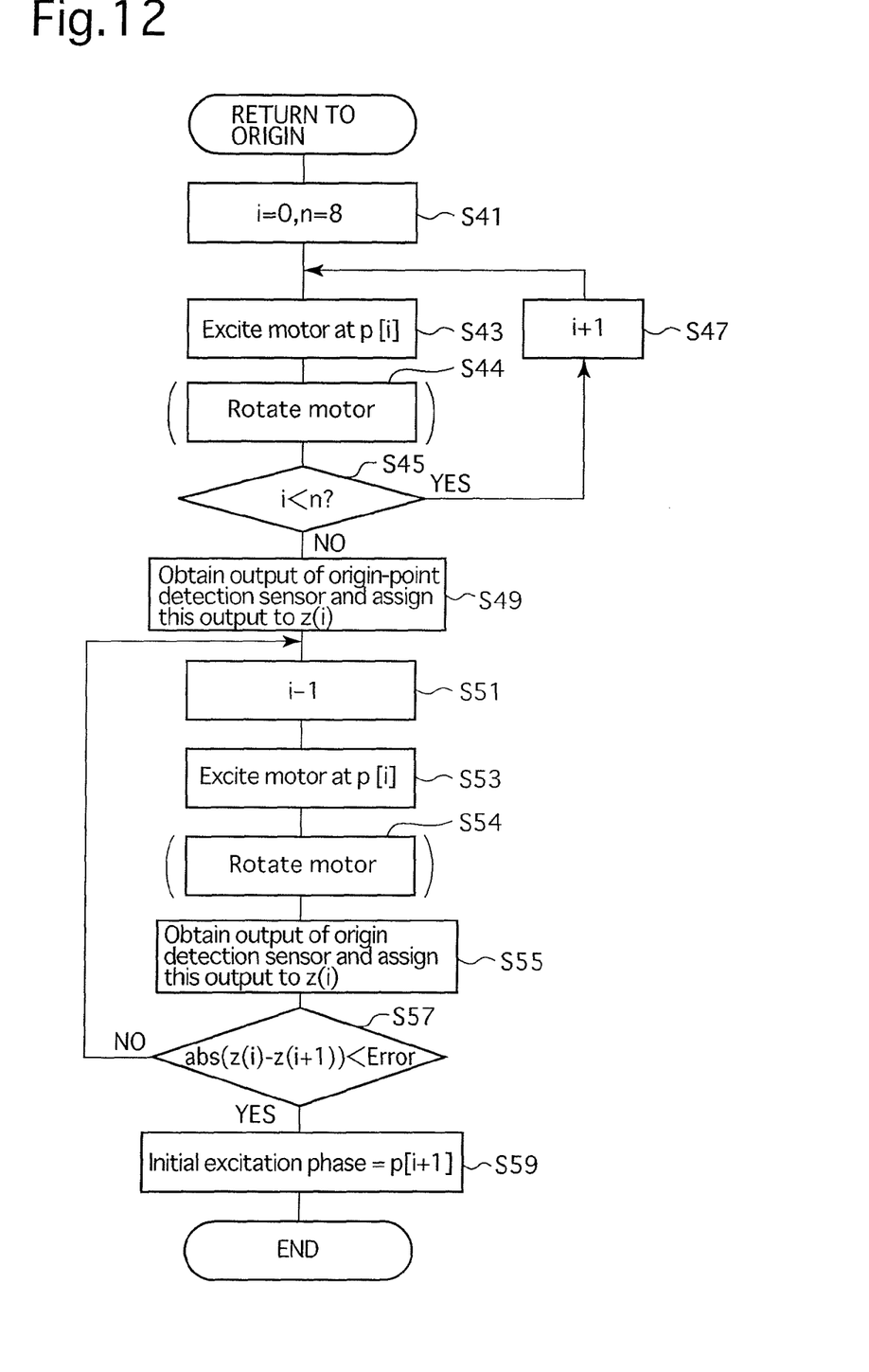
FIG. 12 is a flow chart showing a second embodiment of the origin returning process of the diaphragm control mechanism.

First and second embodiments of an origin returning process of the diaphragm control mechanism will be hereinafter discussed with reference to the flow charts shown in FIGS. 11 and 12, respectively. In each of these embodiments, the stepping motor 53 is rotated by one rotation (revolution) by eight kinds of excitation phases. Table 1 below shows the numbers (identification numbers) of these eight kinds of excitation phases (No. i) and corresponding excitation phases.

TABLE 1

| | EXCITATION PHASE No. i | | | | | | | |
|---|---|---|---|---|---|---|---|---|
| | 0 | 1 | 2 | 3 | 4 | 5 | 6 | 7 |
| EXCITATION PHASE | A | B | C | D | E | F | G | H |

In each of the first and second embodiments, an excitation pattern for driving the stepping motor 53 in a direction from No. 0 to No. 7 corresponds to the driving direction of the stepping motor 53 to stop down the diaphragm, an excitation pattern for driving the stepping motor 53 in the opposite direction corresponds to the driving direction of the stepping motor 53 toward the initial position, and excitations from No. 0 to No. 7 and from No. 7 to No. 0 are repeated. In addition, when the stepping motor 53 is excited at excitation phase No. i and stops, the excitation No. i for the subsequent driving of the stepping motor 53 becomes one before or after the last excitation phase. For instance, if the number of the last excitation phase is 1 (one), the subsequent excitation starts from the excitation phase No. 2 in the case of driving the stepping motor 53 in the diaphragm stop-down direction, or stats from the excitation phase No. 0 in the case of driving the stepping motor 53 in the direction toward the initial position. Such excitation operations are performed by the diaphragm control circuit 49 under control of the CPU 45.

The first embodiment of the origin returning process of the diaphragm control mechanism 51 that is incorporated in the camera body 10 equipped with the stepping motor 53 with such characteristics will be hereinafter discussed with reference to the flow chart shown in FIG. 11. In this origin returning process, firstly an output of the origin detection sensor 63 (origin sensor) is obtained, specifically a detection signal is obtained from the Hall element 65 in this embodiment and assigned to a sensor output z(0) (step S11). The sensor output z(0) represents the stop position of the stepping motor 53 immediately before it is driven (from the initial position).

Subsequently, an initial value 0 (zero) is assigned to the pattern counter i (i=0) and an initial value 8 is assigned to the set number n (n=8) (step S13). The set number n is the value defining the number of excitation steps.

Subsequently, the stepping motor 53 is excited by one step at the excitation phase p[i] in the diaphragm stop-down direction (movable direction) (step S15) to rotate the stepping motor 53 by one step (step S16). Thereafter, it is determined whether or not the excitation counter i is smaller than n (step S17). If the excitation counter i is smaller than n (i<n) (if YES at step S17), the excitation counter i is incremented by one (step S19) and control returns to step S15. Accordingly, the stepping motor 53 is excited by eight steps in the diaphragm stop-down direction.

Upon completion of the driving of the stepping motor 53 by eight steps in the diaphragm stop-down direction (if NO at step S17), a signal output from the origin detection sensor 63 (the Hall element 65) at the current position of the stepping motor 53 is obtained and assigned to the sensor output $z(i)$ (step S21). Thereafter, it is determined whether or not the absolute value of the difference between the current sensor output $z(i)$ at the current position of the slide plate 57 and the sensor output $z(0)$ at the initial position of the slide plate 57 is smaller than a preset tolerance value Error (step S23). Namely, it is determined whether or not the current sensor output $z(i)$ at the current position of the slide plate 57 and the sensor output $z(0)$ at the initial position of the slide plate 57 substantially coincide with each other. If it is determined that the aforementioned absolute value is not smaller than the preset tolerance value Error (if NO at step S23), it is assumed that the slide plate 57 has not yet returned to the initial position, so that the excitation counter i is decremented by one (step S25), the stepping motor 53 is excited by one step at the excitation phase $p[i]$ (step S27) to rotate the stepping motor 53 by one step in the direction toward the initial position (step S28), and control returns to step S21. Thereafter, a signal output from the origin detection sensor 63 is obtained and assigned to the sensor output $z(i)$ (step S21), and subsequently it is determined whether or not the absolute value of the difference between the current sensor output $z(i)$ at the current position of the slide plate 57 and the sensor output $z(0)$ at the initial position of the slide plate 57 is smaller than the preset tolerance value Error (step S23).

The above described process including the operations at steps S21 through S28 is repeated until it is determined at step S23 that the absolute value of the difference between the current sensor output $z(i)$ at the current position of the slide plate 57 and the sensor output $z(0)$ at the initial position of the slide plate 57 is smaller than the preset tolerance value Error. If the absolute value of the difference between the current sensor output $z(i)$ at the current position of the slide plate 57 and the sensor output $z(0)$ at the initial position of the slide plate 57 becomes smaller than the preset tolerance value Error (if YES at step S23), it can be determined that the slide plate 57 has returned to the initial position, so that the initial excitation phase is set to p [i] (step S29), and thereafter the origin returning process ends. Note that "i" returns to "7" when decremented by one from "0". Namely, "i" is a variable which repeatedly changes from 0 to 7.

According to the above described origin returning process, the stop position of the stepping motor 53 and the initial excitation phase $p[i]$ match with each other, so that the stepping motor 53 can be precisely driven stepwise when driven in the subsequent stepping-motor driving operation.

The second embodiment of the origin returning process will be hereinafter discussed with reference to the flow chart shown in FIG. 12. In the second embodiment, the origin returning process is configured to detect when no variation in the output of the origin detection sensor 63 occurs, i.e., when the stepping motor 53 has stopped rotating after returning to the origin, by initially driving a predetermined number of steps in the diaphragm stop-down direction and subsequently driving the stepping motor 53 one step at a time.

In the second embodiment of the origin returning process, first the stepping motor 53 is excited by eight steps in the diaphragm stop-down direction (movable direction) (steps S41, S43, S44, S45 and S47). The operations at steps S41 through S47 are identical to those at steps S13 through S19.

Upon completion of the driving of the stepping motor 53 (if NO at step S45), i.e., if the excitation counter i is not smaller than n, a signal output from the origin detection sensor 63 is obtained and stored as the sensor output $z(i)$ (step S49). Subsequently, the excitation counter i is decremented by one (step S51), the stepping motor 53 is excited by one step at the excitation phase $p[i]$ (step S53) to rotate the stepping motor 53 by one step in the diaphragm opening direction (step S54). Thereafter, a signal output from the origin detection sensor 63 is obtained and stored as the sensor output $z(i)$ (step S55), and subsequently the absolute value of the difference between the previous sensor output $z(i)$ and the second previous sensor output $z(i+1)$ is compared with a preset tolerance value Error (step S57). If the absolute value of the difference between the previous sensor output $z(i)$ and the second previous sensor output $z(i+1)$ is not smaller than the preset tolerance value Error, control returns to step S51 to repeat the operations at steps S51 through S57.

If the absolute value of the difference between the previous sensor output $z(i)$ and the second previous sensor output $z(i+1)$ becomes smaller than the preset tolerance value Error (if YES at step S57), the initial excitation phase is set to $p[i+1]$ (step S59) and thereafter the origin returning process ends.

As described above, according to the present invention, in the case where the interchangeable lens 100 is attached to the camera body 10, the initial position of the stepping motor 53 and the initial excitation phase are made to match (coincide) with each other after the origin returning process is performed, and accordingly, the stepping motor can be precisely driven from the very first step thereafter.

In addition, in the origin returning process according to the present invention, it is sometimes the case that the stepping motor 53 does not stop at the detent position that constitutes the initial position thereof. Even in this case, since the stepping motor 53 is at rest in between the detent position of the last excitation phase and the detent position of the excitation phase immediately before the last excitation phase, the first excitation phase can be activated from the first step by designating the excitation phase immediately before the last excitation phase as the first excitation phase.

Although the position of the diaphragm control rod 19 (the slide plate 57) is detected by the origin detection sensor 63 that is composed of the magnet 64 and the Hall element 65 in the above illustrated embodiment of the SLR camera system, the position of the diaphragm control rod 19 (the slide plate 57) can be detected by any type of origin detection sensor capable of detecting the relative or absolute position of the diaphragm control rod 19 (the slide plate 57) within a predetermined range. In addition, it is desirable that such a sensor is a non-contact sensor; however, a contact type can also be used. Either type of sensor needs to be required to have a sufficient degree of resolution and accuracy to detect the moving distance of the slide plate 57 by one step of movement of the stepping motor 53 with precision. The type of stepping motor to be used as a driving source of the diaphragm control mechanism is not limited to a particular type stepping motor such as the stepping motor 53.

Although the holding mechanism which elastically holds the diaphragm drive rod 19 at a point of origin is released in association with the mirror drive mechanism and thereafter the diaphragm drive rod 19 having moved in the diaphragm stop-down direction is returned to the origin in association with the mirror drive mechanism in the above described embodiment of the SLR camera system, the present invention can also be applied to a structure in which all operations (i.e., including operations carried out by the mirror drive mechanism) can be driven by the stepping motor 53. In addition, the present invention can also be applied to a structure in which the slide plate 57 is continuously biased.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A diaphragm control apparatus incorporated in a camera body, to which an interchangeable lens equipped with a diaphragm apparatus is detachably attached, said diaphragm apparatus including a diaphragm operatively-associated rod for driving an adjustable diaphragm to open and shut said adjustable diaphragm, and said diaphragm control apparatus including a slide member that is driven to move said diaphragm operatively-associated rod, said diaphragm control apparatus comprising:
    a diaphragm drive mechanism including a stepping motor and a lead screw which is driven to rotate by said stepping motor, wherein said slide member is moved by rotation of said lead screw;
    a position detector configured to detect an initial position of said slide member within a predetermined detection range;
    a controller for adjusting an excitation phase of said stepping motor based on a stop position of said slide member detected by said position detector; and
    an elastic biasing member which biases said slide member in a direction toward an open-aperture movable limit position.

2. The diaphragm control apparatus according to claim 1, wherein said position detector detects a position of said slide member relative to a stationary member.

3. The diaphragm control apparatus according to claim 2, wherein, when said slide member is forcibly driven to move by said diaphragm operatively-associated rod to a position corresponding to an initial position of said diaphragm operatively-associated rod, said controller detects said initial position of said slide member via said position detector; excites said stepping motor to rotate said stepping motor in one direction thereof by a predetermined number of steps in one driving excitation pattern; repeats a process of detecting a current position of said slide member via said position detector after exciting said stepping motor by one step in the other direction toward an initial position thereof in another driving excitation pattern, and determining whether a returning movement of said slide member to said initial position thereof is completed by comparing said current position with said initial position of said slide member; and, upon determining that said returning movement of said slide member to said initial position thereof is completed, said controller sets a last excitation pattern as an initial excitation pattern.

4. The diaphragm control apparatus according to claim 2, wherein, when said slide member is forced to move by said diaphragm operatively-associated rod to a position corresponding to an initial position of said diaphragm operatively-associated rod, said controller excites said stepping motor to rotate said stepping motor in one direction thereof by a predetermined number of steps in a driving excitation pattern; repeats a process of detecting a current position of said slide member via said position detector, detecting a current position of said slide member via said position detector after exciting said stepping motor by one step in the other direction toward an initial position thereof in another driving excitation pattern, and determining whether a returning movement of said slide member to said initial position thereof is completed by comparing said former current position and said latter current position of said slide member with each other; and, upon determining that said returning movement of said slide member to said initial position thereof is completed, sets a last previous excitation pattern as an initial excitation pattern.

5. The diaphragm control apparatus according to claim 1, further comprising:
    a biasing-force release mechanism for releasing a biasing force exerted on said slide member by said elastic biasing member; and
    a reset mechanism for resetting said biasing-force release mechanism so that said elastic biasing member again biases said slide member in said direction toward said open-aperture movable limit position.

6. The diaphragm control apparatus according to claim 5, wherein said diaphragm control apparatus is accommodated in an SLR camera provided with a mirror drive mechanism that performs a mirror-up operation and a mirror-down operation,
    wherein said biasing-force release mechanism and said reset mechanism are operatively associated with said mirror drive mechanism so that said biasing-force release mechanism is driven when said mirror drive mechanism performs a mirror-up operation and said reset mechanism resets said biasing-force release mechanism so that said elastic biasing member again biases said slide member when said mirror drive mechanism performs a mirror-down operation.

7. The diaphragm control apparatus according to claim 1, wherein said slide plate is movable by forcing said lead screw and said stepping motor to rotate via said diaphragm operatively-associated rod.

8. The diaphragm control apparatus according to claim 1, wherein said position detector comprises a non-contact sensor having an auto-compensation function.

9. The diaphragm control apparatus according to claim 1, wherein said position detector comprises a magnet and a Hall element.

10. The diaphragm control apparatus according to claim 1, wherein said diaphragm apparatus of said interchangeable lens comprises a diaphragm ring positioned coaxially with an optical axis of said interchangeable lens to be rotatable about said optical axis, said diaphragm operatively-associated rod being integrally formed with said diaphragm ring to project rearward from a rear end of said interchangeable lens.

11. The diaphragm control apparatus according to claim 5, wherein said biasing-force release mechanism comprises a cam member, and
    wherein said elastic biasing member is a spring member which projects from said cam member.

12. An SLR camera comprising:
    a diaphragm control apparatus incorporated in a camera body of said SLR camera, to which an interchangeable lens equipped with a diaphragm apparatus is detachably attached, said diaphragm apparatus including a diaphragm operatively-associated rod for driving an adjustable diaphragm to open and shut said adjustable diaphragm, and said diaphragm control apparatus including a slide member that is driven to move said diaphragm operatively-associated rod,
    wherein said diaphragm control apparatus includes a diaphragm drive mechanism including a stepping motor and a lead screw which is driven to rotate by said stepping motor, wherein said slide member is moved by rotation of said lead screw; a position detector configured to detect an initial position of said slide member within a predetermined detection range; and a controller for adjusting an excitation phase of said stepping motor based on a stop position of said slide member detected by said position detector; and
    an elastic biasing member which biases said slide member in a direction toward an open-aperture movable limit position.

* * * * *